United States Patent [19]

Watson et al.

[11] 4,214,986

[45] Jul. 29, 1980

[54] MAGNETIC SEPARATOR FOR SEPARATING MAGNETIZABLE PARTICLES FROM A FLUID, METHOD AND APPARATUS

[75] Inventors: James H. P. Watson, St. Austell; James P. E. Jones, Par, both of England

[73] Assignee: English Clays Lovering Pochin & Company, Limited, Cornwall, England

[21] Appl. No.: 950,543

[22] Filed: Oct. 12, 1978

Related U.S. Application Data

[63] Continuation of Ser. No. 792,015, Apr. 28, 1977, abandoned.

[30] Foreign Application Priority Data

Apr. 29, 1976 [GB] United Kingdom ............... 17567/76

[51] Int. Cl.$^2$ .............................................. B01D 35/06

[52] U.S. Cl. ................................. 210/42 S; 210/222; 210/236

[58] Field of Search ................... 209/5, 214, 222, 223; 210/222, 223, 236, 42 S

[56] References Cited

U.S. PATENT DOCUMENTS

| | | | |
|---|---|---|---|
| 3,326,374 | 6/1967 | Jones | 209/214 |
| 3,375,925 | 4/1968 | Carpenter | 209/214 |
| 3,471,011 | 10/1969 | Iannicelli | 209/214 |
| 3,887,457 | 6/1975 | Marston | 210/222 |
| 3,920,543 | 11/1975 | Marston et al. | 210/222 |
| 3,935,095 | 1/1976 | Susse | 209/222 |

FOREIGN PATENT DOCUMENTS 937537 11/1973 Canada ..................................... 210/222

*Primary Examiner*—Theodore A. Granger
*Attorney, Agent, or Firm*—Armstrong, Nikaido, Marmelstein & Kubovcik

[57] ABSTRACT

In the method described fluid containing magnetizable particles is introduced into a separating chamber containing a fluid-permeable mass of magnetizable material and held therein for a finite length of time. During this time the magnetizable material is moved into a magnetic field where the fluid is drained from the magnetizable material leaving magnetizable particles entrained in this material. This draining may be achieved either by providing relative movement between the separating chamber and the magnetizable material or by discharging the fluid from the separating chamber. The magnetic separator described comprises a plurality of interconnected separating chambers, and associated masses of magnetizable material, which are moved continuously through a separating zone in which a magnetic field is established by a magnet. In this zone each mass of magnetizable material is drained and, outside this zone, the magnetizable particles entrained in the magnetizable material are removed by flushing.

16 Claims, 7 Drawing Figures

MAGNETIC SEPARATOR FOR SEPARATING MAGNETIZABLE PARTICLES FROM A FLUID, METHOD AND APPARATUS

This is a continuation of application Ser. No. 792,015, filed Apr. 28, 1977 now abandoned.

This invention relates to a method of, and a magnetic separator for, separating magnetisable particles, for example paramagnetic particles, from a fluid in which they are suspended.

BACKGROUND OF THE INVENTION

The force exerted on a spherical particles of magnetisable material in a magnetic field is given by the expression:

$$F = \chi_m \frac{\pi D^3}{6} \cdot H \cdot \frac{dH}{dx} \qquad (1)$$

wherein $\chi m$ is the volume magnetic susceptibility of the material, D is the diameter of the particles, H is the magnetic field intensity and dH/dx is the rate of change of the magnetic field intensity with distance. From this expression it can be seen that, if both the diameter D and the volume magnetic susceptibility $\chi m$ of a particle are small, it is necessary to provide a high intensity magnetic field and/or a magnetic field whose intensity changes rapidly with distance to exert an appreciable force on the particle.

It can be shown that, in a simple wet magnetic separator containing magnetisable material constituted by a single ferromagnetic wire of radius a and saturation magnetisation $M_s$, the chance of a paramagnetic particle, of radius R and magnetic susceptibility $\chi m$ in a fluid of viscosity $\eta$ moving with velocity $V_o$ relative to the wire in a uniform magnetic field of intensity H applied in a direction opposite to the direction of flow of the fluid, being captured by the wire, whose longitudinal axis is orientated in a direction perpendicular to the direction of the magnetic field and to the direction of flow of the fluid, increases with the ratio $V_m/V_o$, where $V_m$ is a quantity having the dimension of speed which may be called the "magnetic velocity" and is given by the expression:

$$V_m = \frac{2}{9} \frac{(\chi_m H M_s R^2)}{\eta \cdot a} \qquad (2)$$

It can therefore be seen that the chance of capturing the paramagnetic particle may be increased either by increasing the value of the magnetic field intensity H or by decreasing the value of the velocity $V_o$.

Considering both expressions (1) and (2) together, it can be seen that a high efficiency of capture of magnetisable particles in a magnetic separator may be achieved either by maximising the value of the force F in expression (1), or alternatively by reducing the value of the velocity $V_o$ in which case the magnetisable particle may be acted upon by a smaller force but passes the collecting sites within the packing material at a lower velocity and therefore has a greater chance of being captured. However, if the value of $V_o$ is small, the amount of feed material which can be passed through the separating chamber in a given time will be small.

Canadian patent specification No. 937,537 discloses a continuous magnetic separator comprising a plurality of separating chambers linked together to form an endless loop. The loop of separating chambers is continuously rotatable between pairs of yokes of electromagnets. Each separating chamber has an open top and a perforated bottom and contains magnetisable material in the form of partially cut and expanded sheet metal. In use of the separator, the material to be treated is introduced into each separating chamber when that separating chamber is within a magnetic field associated with one of the electromagnets. Magnetisable particles within the feed material are retained in the magnetisable material while the remainder of the feed material passes straight through the separating chamber and out through the perforated bottom. Whilst, in use of such a separator, a relatively high throughflow rate of feed material may be provided whilst maintaining a reasonable efficiency of separation (by the choice of a suitably low value of $V_o$), the velocity $V_o$ which is related to the throughflow cross-section of the separating chambers will still be such that the more weakly magnetisable particles will not be separated (unless a very high intensity magnetic field is utilized). Also the flow of feed material through the separating chambers will be turbulent, thus providing varying values of $V_o$ throughout the volume of each separating chamber and prejudicing the separation efficiency. Thus the most weakly magnetisable particles either will not be captured within the magnetisable material or will be captured and subsequently swept out of the material.

SUMMARY OF THE INVENTION

According to one aspect of the present invention, there is provided a method of separating magnetisable particles from a fluid, which method comprises:

(a) at least partially filling a separation chamber containing a fluid-permeable mass of magnetisable material with fluid containing magnetisable particles, the fluid being prevented from escaping from the separating chamber during filling;

(b) draining fluid from the mass of magnetisable material;

a magnetic field being maintained in the mass of magnetisable material at least (i) for a finite length of time after filling and immediately prior to draining, and (ii) during draining, so that magnetisable particles within the fluid are magnetised and attracted to, and retained in, the mass of magnetisable material; and (c) removing the magnetisable particles retained in the mass of magnetisable material.

By this method, the velocity $V_o$ of the fluid relative to the mass of magnetisable material during separation will initially be substantially zero. Thus optimum conditions for the attraction of magnetisable particles to the magnetisable material are created. This enables high separation efficiency to be obtained with a relatively low intensity applied magnetic field. The fluid is preferably drained from the magnetisable material at a velocity which is sufficiently low that the number of magnetisable particles which have been attracted to collecting sites within the mass of magnetisable material and which are subsequently swept off these sites by the fluid is small.

The time during which the fluid is held within the magnetic field prior to draining being initiated may be very short (a fraction of a second) and will generally be less than a minute.

The method also enables the turbulence of the fluid within the magnetisable material to be minimised. Advantageously the fluid is allowed to become substantially static after the separating chamber has been filled and before draining is initiated. Air bubbles created in the fluid during filling may a be expelled during this time. Furthermore the method enables fluid to be drawn from the magnetisable material in a particularly uniform and controlled manner A preferred embodiment of the present invention provides a method of separating magnetisable particles from a fluid utilizing a chain of separating chambers which is passed continuously through a separating zone in which a magnetic field is established, which method comprises:

(a) at least partially filling each separating chamber, containing a respective fluid-permeable mass of magnetisable material, with fluid containing magnetisable particles, the fluid being prevented from escaping from the separating chamber during filling;

(b) draining fluid from the mass of magnetisable material associated with each separating chamber in the separating zone a finite length of time (i) after filling and (ii) after the separating chamber has passed into the separating zone, magnetisable particles within the fluid which have been magnetised and attracted to the mass of magnetisable material being retained in the mass of magnetisable material; and (c) removing the magnetisable particles retained in the mass of magnetisable material associated with each separating chamber after the mass of magnetisable material has passed out of the separating zone.

The throughflow rate may be increased by increasing the rate at which the separating chambers are passed through the separating zone. This increase will not affect the value of $V_o$ provided that the length of the path through the separating zone is sufficient to allow adequate time for draining to be completed. The draining velocity of the fluid preferably does not exceed 200 cm/min.

The method of the invention is particularly applicable to the separation of magnetisable particles of very small size or of low magnetic susceptibility, for example paramagnetic particles, from a fluid. If paramagnetic particles are to be separated, a ferromagnetic material should be utilized for the mass of magnetisable material. The method may therefore advantageously be utilized for the purification of a kaolinitic material which contains magnetisable impurities which are predominantly paramagnetic. Naturally occuring kaolinite generally has a mass magnetic susceptibility of $0.6\times10^{-8}$ to $1.9\times10^{-8}$ (in S.I. units), the main impurity in English kaolinite being mica which has a specific magnetic susceptibility between $4\times10^{-8}$ and $6\times10^{-8}$ and the main impurity in American kaolinite being titanium dioxide which has a specific magnetic susceptibility of approximately $2.5\times10^{-8}$.

The separating chamber may be disposed in or outside the magnetic field while it is being filled with fluid containing magnetisable particles.

After the fluid has been drained from the mass of magnetisable material, or partially concurrently therewith, and while the mass of magnetisable material is still disposed in the magnetic field, fluid, preferably clean water, may be passed through the mass of magnetisable material to flush out any substantially non-magnetisable particles which may have become physically entrained in the mass of magnetisable material. The magnetisable particles entrained in the mass of magnetisable material may be removed by passing fluid, preferably clean water, through the mass of magnetisable material outside the magnetic field, optionally after having demagnetised the mass of magnetisable material by means of a degaussing coil supplied with alternating current whose amplitude is gradually decreased to zero.

The magnetic field is conveniently of an intensity less than 10,000 gauss, and may be applied by means of one or more electromagnet coils provided with ferromagnetic pole pieces and return frame. Alternatively it is possible, and advantageous because of the elimination of power costs to maintain the magnetic field, to use one or more permanent magnets constructed from a suitable ferrite material or ferromagnetic alloy.

According to another aspect of the present invention there is provided a magnetic separator for separating magnetisable particles from a fluid, the apparatus comprising:

(a) a chain of separating chambers;

(b) a respective fluid-permeable mass of magnetisable material associated with each separating chamber;

(c) magnet means for establishing a magnetic field in a separating zone;

(d) means for passing the chain of separating chambers continuously through the separating zone;

(e) filling means for at least partially filling each separating chamber, with the associated mass of magnetisable material therein with fluid containing magnetisable particles, whilst preventing fluid from escaping from the separating chamber;

(f) draining means for draining fluid from the mass of magnetisable material associated with each separating chamber in the separating zone a finite length of time (i) after filling and (ii) after the separating chamber has passed into the separating zone, magnetisable particles within the fluid which have been magnetised and attracted to the mass of magnetisable material being retained in the mass of magnetisable material; and (g) means for removing the magnetisable particles retained in the mass of magnetisable material associated with each separating chamber after the mass of magnetisable material has passed out of the separating zone.

Preferably the means for removing magnetisable particles comprises means for flushing further fluid through the mass of magnetisable material associated with each separating chamber outside the separating zone.

According to one embodiment of said another aspect, the draining means comprises a closable outlet of each separating chamber. Preferably means are provided for automatically opening the outlet of each separating chamber a finite length of time after filling, and for automatically closing the outlet of each separating chamber after the magnetisable particles have been removed from the mass of magnetisable material associated with that separating chamber. Furthermore it is advantageous if the throughflow cross-section of the outlet of each separating chamber is adjustable between a first value and a second value greater than the first value and means are provided for automatically adjusting the throughflow cross-section of the outlet from the first value to the second value after draining of the first-mentioned fluid and before further fluid is flushed through the mass of magnetisable material.

According to an alternative embodiment of said another aspect, the draining means comprises means for providing relative movement between each separating chamber and the associated mass of magnetisable material. Preferably a track is provided for the separating chambers, the track being inclined downwards in the direction of motion of the separating chambers in the separating zone, and the associated masses of magnetisable material are linked together and arranged to be moved substantially horizontally through the separating zone at substantially the same speed as the separating chambers, so that, as the separating chambers and the associated masses of magnetisable material pass through the separating zone, the separating chambers gradually descend below the level of the masses of magnetisable material.

The mass of magnetisable material may comprise a filamentary material, consisting of, for example, fine wires packed singly or in bundles in the separating chamber, or pieces of woven wire mesh, or a randomly oriented filamentary material, such as steel wool; a particulate material, in the form of, for example, spheres, pellets, cubes or particles of more irregular shapes; or metallic foam material, such as can be made, for example, by electroplating an electrically conductive foam rubber or plastics material with a metal and removing the rubber or plastics material with a suitable solvent. The mass of magnetisable material is advantageously a ferromagnetic material which is also corrosion resistant such as, for example, a stainless steel having the ferritic or martensitic form. An alloy steel containing from 4% to 27% by weight of chromium and suitably heat treated is an example of a suitable material.

BRIEF DESCRIPTION OF THE DRAWINGS

In order that the invention may be more fully understood, three constructional examples of magnetic separator in accordance with the present invention will now be described with reference to the accompanying drawings, in which.

DETAILED DESCRIPTION OF THE DRAWINGS

Figure 1:
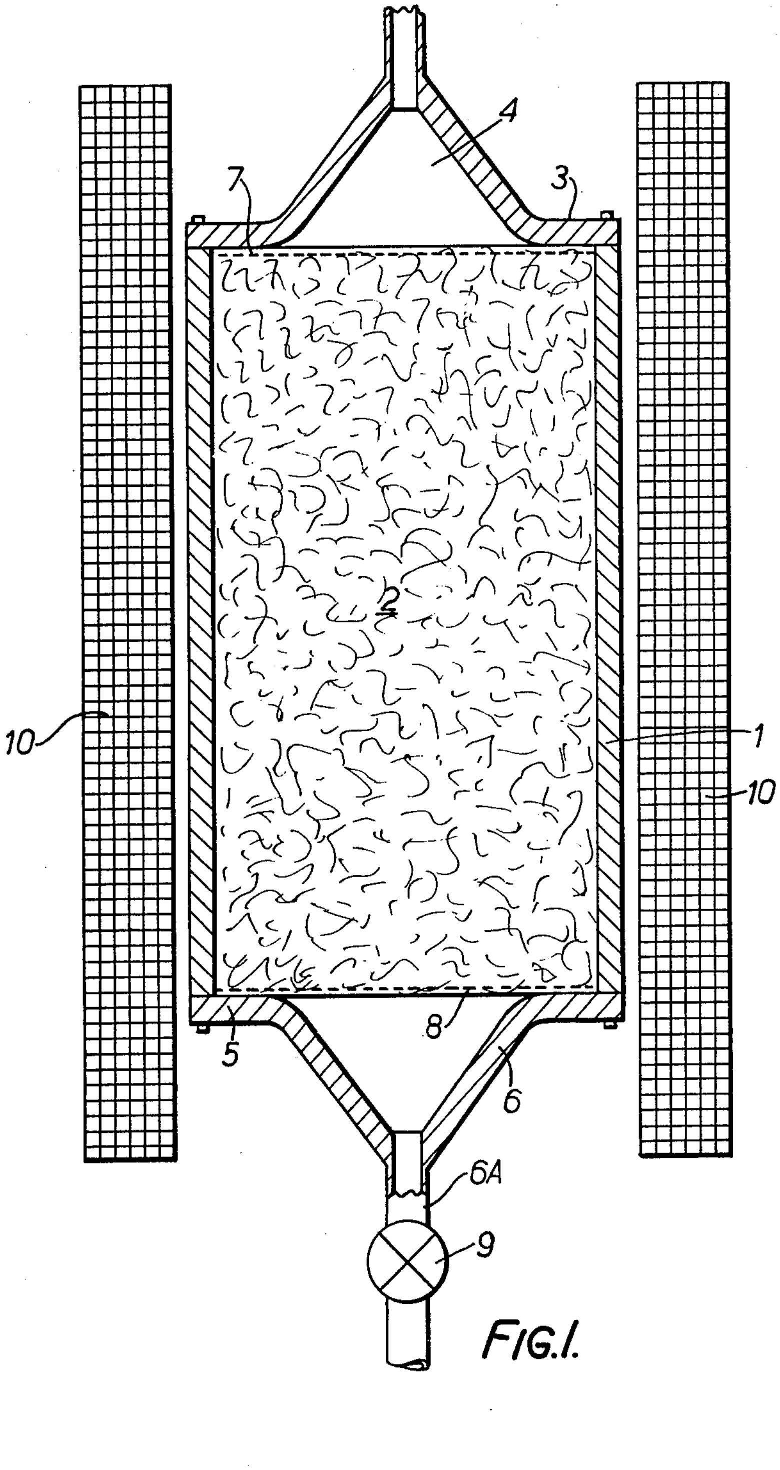
FIG. 1 is a diagrammatic vertical section of part of a first construction.

FIG. 1 shows a separating chamber 1 of square cross-section constructed of non-magnetisable materials and packed with a mass of ferromagnetic filamentary material 2 comprising corrosion resistant steel wool. The density of the mass of filamentary material is such that 95% of the volume occupied by the mass of material is void, the remaining 5% being occupied by the strands of the steel wool. The separating chamber 1 is provided, at its upper end region, with an upper end wall 3 defining a conical inlet portion 4 for the input of feed slurry containing magnetisable particles to the separating chamber, and, at its lower end region, with a lower end wall 5 defining a conical outlet portion 6 for the exit of the fluid from the separating chamber. Substantially non-magnetisable wire meshes 7 and 8 are provided to retain the mass of material at the upper and lower end regions of the separating chamber respectively. Draining means in the form of a valve 9 is provided in an outlet duct 6A connected to the outlet portion 6 which valve 9 serves to control the velocity at which the feed slurry exits from the separating chamber. The separating chamber is shown disposed between two pole pieces 10 of an electromagnet. The apparatus comprises a chain of two or more such separating chambers. The electromagnet may be replaced by a large permanent magnet.

In operation, the electromagnet is energised and the separating chamber is positioned between the pole pieces 10 with the valve 9 closed, and filled with feed slurry. The valve 9 is then opened to allow slurry to flow out of the separating chamber at an appropriate low velocity, and the magnetisable particles in the slurry which have been magnetised by the magnetic field are attracted to collecting sites in the mass of material, where most of these particles will be retained while the separating chamber is acted upon by the magnetic field. When all or part of the slurry 1 has flowed out of the separating chamber by way of the outlet duct 6A, clean water is passed through the separating chamber at the same velocity and in the same direction as the feed slurry in order to rinse away substantially non-magnetisable material which has become physically entrained in the packing material. The separating chamber is then removed from the magnetic field in order to demagnetise the mass of material, those magnetisable particles which have been retained in the mass of material being removed by means of a rapid flow of clean water through the mass of material in the same direction as the flow of feed slurry. The other or another separating chamber is moved into the magnetic field and the cycle repeated.

Figure 2:
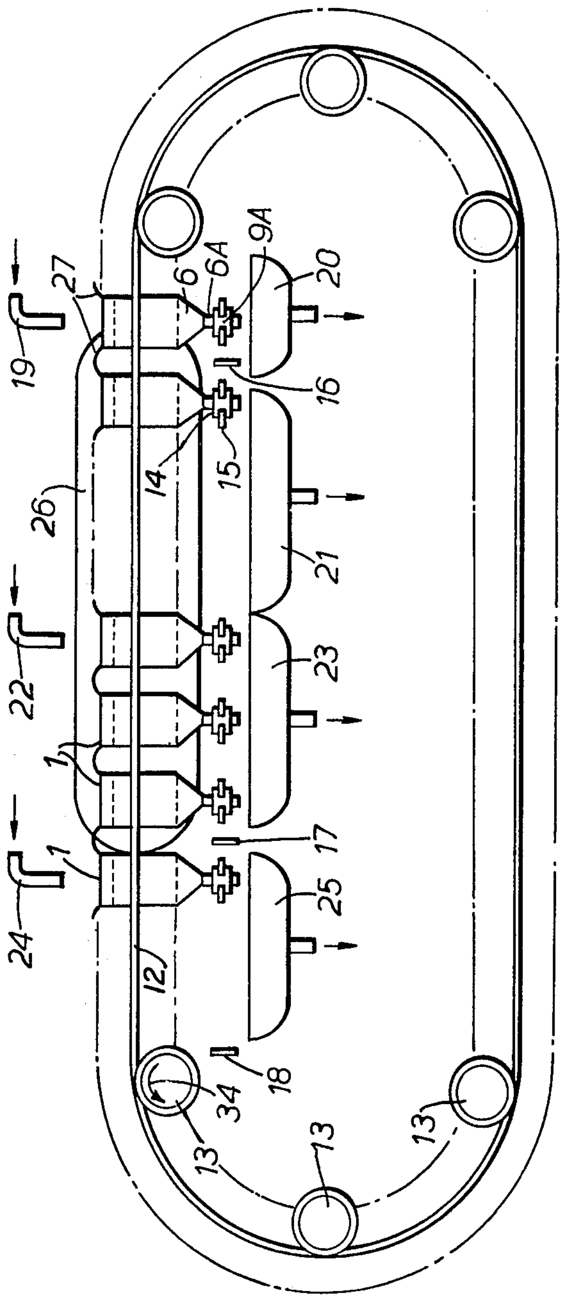
FIG. 2 is a diagrammatic vertical section of a second construction.
Figure 3:
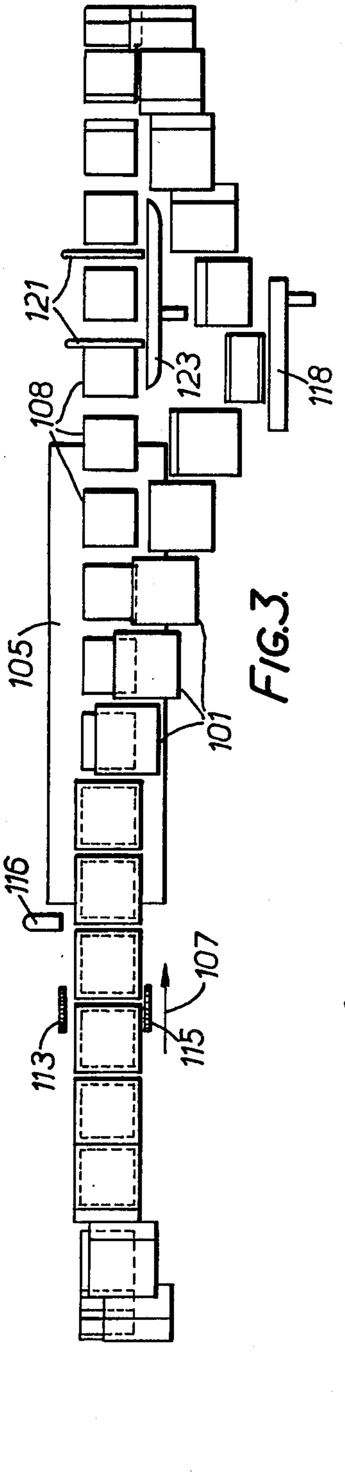
FIG. 3 is a diagrammatic vertical section of a third construction.
Figure 4:
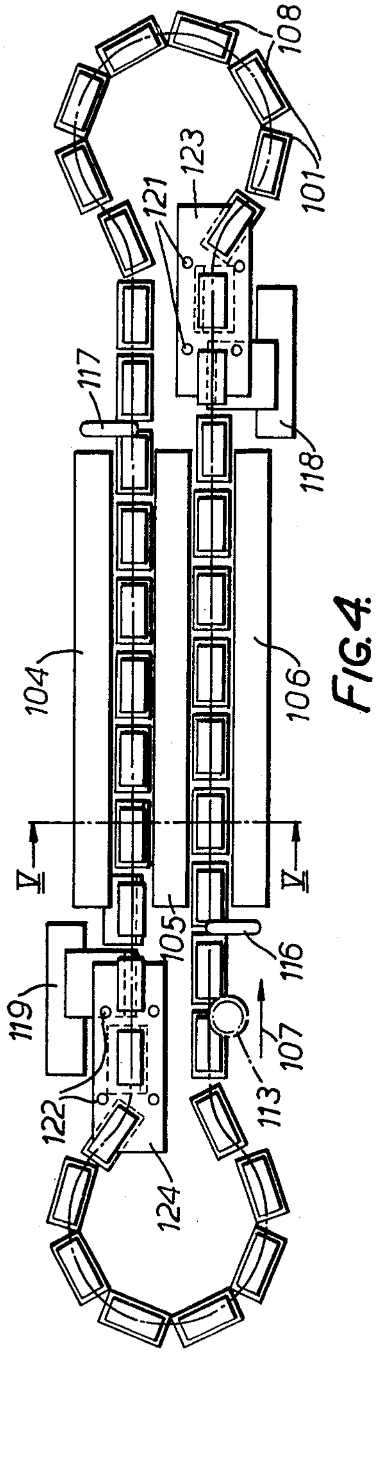
FIG. 4 is a diagrammatic plan view of the third construction.
Figure 5:
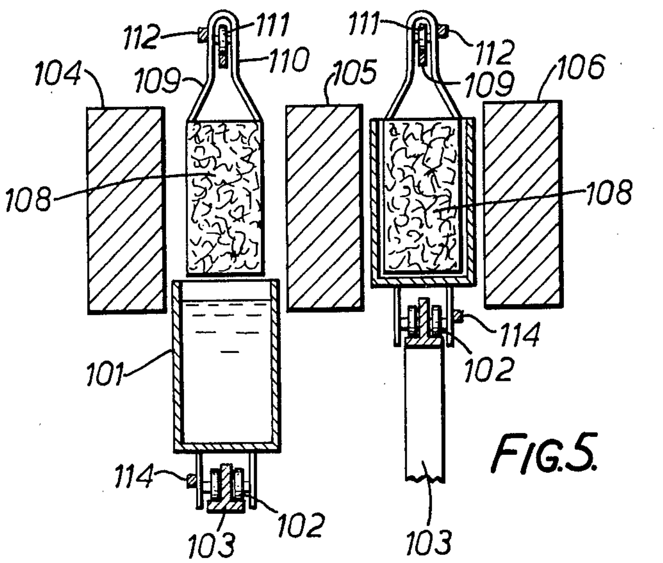
FIG. 5 is a section taken along the line V—V of FIG. 4.
Figure 6:
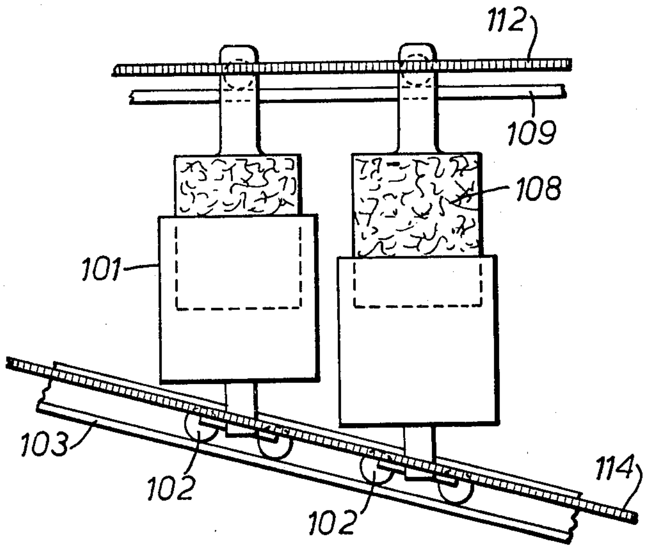
FIGS. 6 and 7 show details of the third construction.

In the apparatus of FIG. 2, there is provided a plurality of separating chambers 11, each similar in construction to the separating chamber described above, but having an open top and a three position valve 9A, fixed at each side of a movable endless chain 12 which is driven by sprockets 13 in the direction shown by the arrow 34. In the first position of the valve 9A, there is no flow through the outlet duct 6A; in the second position liquid can flow at a predetermined slow rate through the outlet duct 6A; and in the third position liquid can flow through the outlet duct 6A at high velocity. The positions of the valve 9A on each separating chamber are changed by means of a cylindrical hub 14 which is provided with three projecting bars 15 equally spaced about its periphery. The projecting bars 15 co-operate with upstanding posts 16, 17 and 18 which are fixed in such positions that each post contacts one of the projecting bars 15 on each separating chamber and changes the position of the valve 9A of that separating chamber as the separating chamber passes the post.

In use of the apparatus, feed slurry is introduced into the separating chambers from a conduit 19 as they pass below that conduit into a separating zone in which a magnetic field is established, and any overflow from the separating chambers is caught by a trough 20 disposed directly below the conduit 19 and returned to the feed slurry reservoir (not shown). The treated slurry leaving the separating chambers by way of the outlet duct 6A is collected by a trough 21. Clean water for flushing through the separating chambers at low velocity is provided by means of a conduit 22 and the middlings fraction, comprising predominantly non-magnetisable material which has been physically entrained in the mass of magnetisable material of the separating chamber and is flushed out by this clean water, is collected in a trough 23. A conduit 24 for supplying clean water at high velocity and high pressure is provided just outside the separating zone in which the magnetic field is established and the magnetisable particles in the mass of magnetisable material are flushed into a trough 25. The magnetic field is established in an elongate separating zone by means of a pair of magnetic pole pieces, one of which is shown at 26. The magnetic field may be generated by electromagnetic coils or by permanent magnets. The separating chambers 1 are connected by flexible skirts 27 which minimise the loss of feed slurry between separating chambers. In operation a particular separating chamber in the chain approaches the separating zone in which the magnetic field is established with its valve 9A in the closed position. The separating chamber passes beneath the conduit 19 and receives a full charge of feed slurry. The separating chamber then passes the post 16 which contacts one of the projecting bars 15 on the hub 14 of the valve 9A and moves the valve to the second position in which treated slurry flows out of the separating chamber into the trough 21 at a rate which is predetermined to give the required linear velocity of slurry through the mass of magnetisable material for the intensity of the magnetic field between the pole pieces. The separating chamber then passes beneath the conduit 22 and receives a full charge of clean water which flows through the mass of magnetisable material and washes any entrained non-magnetisable material into the trough 23. The separating chamber then emerges from the zone in which the magnetic field is established and one of the projecting bars 15 contacts the post 17 which moves the valve 9A to the third position. The chamber is then filled with clean water under high pressure from the conduit 24 and the magnetisable particles which have been collected by the mass of magnetisable material are flushed into the trough 25. The post 18 then returns the valve 9A to the first or closed position and the separating chamber completes its circuit back to the starting position. The magnetic field intensity within the separating zone does not exceed 6,000 gauss. The magnet length, or the length of the path followed by the separating chambers within the predetermined zone, is approximately twice the distance travelled by the chain in the time taken for the slurry to drain completely through the mass of magnetisable material. This is to allow time for each separating chamber to be filled with clean water and to empty agin at a velocity equal to the draining velocity of the slurry before the separating chamber leaves the zone in which the magnetic field is established. If desired the filling of the separating chamber with clean water may be commenced before the slurry has completely drained away, but this may lead to some dilution of the product.

Clearly the maximum length of the magnet will be governed by economic factors, but it should be economically feasible to provide a magnet having an effective length of 2 meters, and perhaps even of 5 meters.

FIGS. 3 to 7 show a magnetic separator comprising a plurality of separating chambers in the form of tanks 101 each of which is provided with bogey wheels 102 (see FIGS. 5 to 7) pivotally mounted on feet attached to the bottom of each tank, the bogey wheels 102 being arranged to run on a single track 103 of inverted "T" shaped cross-section. The track 103 follows a substantially dumbell-shaped loop, the straight portions of the track 103 passing between ferrite permanent magnets 104, 105 and 106. On each circuit of the loop two complete cycles of the separation process are performed and the direction in which the tanks 101 move round the track is shown by an arrow 107. Masses of magnetisable material in the form of a plurality of collecting element 108, each of which comprises a packing of ferromagnetic stainless steel wool contained in a basket of wire mesh, also travel round an overhead single rail 109 which follows the same closed loop as the track 103. Each collecting element 108 is provided with suspending means 110 (see FIG. 5) on which a pulley wheel 111 is mounted so as to be freely rotatable. The pulley wheel 111 is provided with a groove around its peripheral surface by means of which it engages the rail 109. The collecting elements 108 are linked together by a belt 112 to for an endless chain which is driven in the direction of the arrow 107 by means of a toothed wheel 113 (see FIGS. 3 and 4) which is in turn driven by an electric motor (not shown) through suitable means for controlling the speed. Similarly the tanks 101 are linked together by a belt 114 to form an endless chain which is driven in the direction of the arrow 107 by means of a toothed wheel 115 (see FIG. 3).

Figure 7:
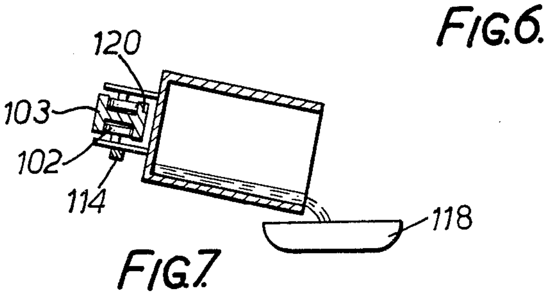

The overhead rail 109 remains horizontal round the entire loop, but the track 103 for the tanks 101 rises and falls in the following manner as it follows the loop. Before the tanks 101 enter the separating zone between the ferrite permanent magnets 104, 105, 106 the track 103 is substantially level and at such a height that the collecting elements 108 are completely contained within the tanks 101. Upstream of the separating zone, on either side of the loop, conduits 116 and 117 are provided to fill the tanks 101 and collecting elements with feed slurry as they pass underneath the conduits. Shortly after the tanks 101 enter the separating zones between the ferrite magnets 104, 105, 106 the track 103 is inclined downwards in the direction of motion of the tanks 101, as shown more clearly in FIG. 6. In these regions the tanks 101 gradually descend below the level of the collecting elements 108 so that slurry containing predominantly non-magnetisable particles drains slowly from the collecting elements 108 and is retained in the tanks 101 while magnetisable particles are held in the collecting elements 108. As the tanks 101 leave the regions between the ferrite magnets 104,105 106, the track 103 levels out again and also twists through a little over 90° about its longitudinal axis so that the tanks are each tipped sideways as shown in FIG. 7 to discharge their contents into collecting pans 118 and 119 respectively. The track 103 is then twisted in the reverse direction to return the tanks 101 to their upright position. A guard member 120 (see FIG. 7) is provided on the track 103 in the region in which the track 103 is twisted to prevent the tanks 101 from leaving the track 103 in this region. There are provided in the same part of the loop as, and at a higher level than, the collecting pans 118, 119 two sets of vertical spray bars 121 and 122 respectively (see FIG. 4). The purpose of these spray bars 121, 122 is to direct fine sprays of water at high pressure into the collecting elements 108 in order to remove the captured magnetisable particles which are flushed into further collecting pans 123 and 124 which lie below the spray bars. If desired other spray bars may be provided at or near the centre of the separating zones between the blocks of ferrite magnets 104, 105, 106 in order to wash substantially non-magnetisable material which may have become physically entrained in the collecting elements 108 into the tanks 101 before the tanks leave the zone in which the magnetic field is established. The tanks 101 and collecting elements 108 are then turned through 180° about an axis perpendicular to the paper in FIG. 4 since the rail 109 and the track 103 follow a curved path describing one of the rounded ends of the dumbell-shaped loop. At this part of the loop the track 103 climbs steadily until the tanks once again substantially enclose the collecting elements.

The cycle of operations is then repeated as the tanks 101 and collecting elements 108 make a second pass between the ferrite magnets in the direction opposite to that of the first pass.

The magnetic field between the ferrite magnets 104 and 105 and 105 and 106 respectively may be, for example, 1000 gauss and the velocity of the tanks 101 and collecting elements 108 is controlled to give the desired slow rate of separation between the collecting elements 108 and the suspension contained in the tanks 101 so that weakly magnetisable particles may be captured and retained in the collecting elements 108 to leave the suspension in the tanks 101 substantially free of magnetisable particles.

By the use of any of the above described constructions it is possible to separate magnetisable particles, even weakly magnetisable or paramagnetic particles, from substantially non-magnetisable particles using magnetic fields of relatively low intensity, thereby avoiding the high costs involved in providing high intensity magnetic fields.

EXAMPLE 1

An English China clay, having a particle size distribution such that 45% by weight consisted of particles having an equivalent spherical diameter smaller than 2 microns and 15% by weight of particles having an equivalent spherical diameter larger than 10 microns, was mixed with water so as to form a suspension containing 20% by weight of solids, there being dissolved in the water 0.35 g. of sodium silicate per 100 g. of dry clay to act as a deflocculant for the clay and sufficient sodium carbonate to raise the ph to 8.5. The suspension thus formed was passed through a separating chamber of the type described above with reference to FIG. 1, the velocity of flow being presented by adjusting the valve 9 and the suspension being held within the chamber for a finite time.

A magnetic field was established between the pole pieces 10 of the electromagnet and the intensity of the magnetic field was varied by adjusting the current supplied to the electromagnet coil. Samples of the suspension were then introduced into the separating chamber and drained therefrom at different velocities and under different applied magnetic field intensities and, in each case, the suspension which had passed through the separating chamber was collected and the clay flocculated, dewatered by filtration, gently dried and the dry cake milled to a fine powder. The brightness of the dry powder was then determined by measuring the percentage reflectance of light of 458 nm wavelength from the powder. The brightness of a kaolin clay is a measure of its purity and especially of the amount of discoloring iron-containing impurities which it contains. The results are given in the following table.

TABLE 1

| Magnetic field intensity (gauss) | Velocity of suspension through separating chamber (cm/min) | % reflectance of powder to light of 458 nm wavelength |
|---|---|---|
| 6,000 | 5 | 90.6 |
| " | 20 | 89.7 |
| " | 50 | 88.8 |
| " | 80 | 88.4 |
| " | 120 | 88.1 |
| " | 200 | 87.8 |
| 2,000 | 5 | 89.3 |
| " | 20 | 88.5 |
| " | 50 | 87.3 |
| " | 80 | 86.5 |
| 1,000 | 5 | 88.5 |
| " | 20 | 87.6 |
| " | 50 | 86.8 |
| " | 80 | 86.3 |

The percentage reflectance to light of 458 nm wavelength for untreated clay powder was 84.4. The results show that a useful increase in brightness of approximately 4 units can be obtained with a field intensity of 6,000 gauss and a velocity of 80 cm/min, or a field intensity of 2,000 gauss and a velocity of 20 cm/min, or a field intensity of 1,000 gauss and a velocity of 5 cm/min. The field intensity of 1,000 gauss is within the capabilities of a permanent magnet and it has not hitherto been thought possible to remove paramagnetic discolouring impurities from fine clays using permanent magnets.

EXAMPLE 2

Samples of the suspension described with reference to Example 1 were passed through apparatus for separating magnetisable particles from the suspension as shown in FIG. 2. Each separating chamber was in turn filled with the suspension and then passed between the poles of the magnet. Whilst each separating chamber was still within the separating zone, clean water was passed through each separating chamber in the same direction and at the same velocity. The separating chambers were flushed out with clean water outside the separating zone to remove the magnetic fraction.

The table below gives eight sets of conditions under which an improvement in brightness of about 3 units of the suspension was obtained. Two types of separating chamber were used, each having the same general design as that shown in FIG. 2, but the first having a packing depth of 50 cm, and a square cross-section of side 20 cm, and the second having a packing depth of 25 cm, and a square cross-section of side 40 cm.

TABLE 2

| Packing depth (cm.) | Packing width (cm) | Magnet length (cm) | Magnetic Field Intensity (gauss) | Draining velocity (cm/min) | Velocity of chain (cm/min) | Production rate (cc/min) |
|---|---|---|---|---|---|---|
| 50 | 20 | 500 | 1,000 | 20 | 100 | $10^5$ |
| 50 | 20 | 200 | 2,000 | 50 | 100 | $10^5$ |
| 50 | 20 | 2,000 | 2,000 | 50 | 1000 | $10^6$ |
| 50 | 20 | 500 | 6,000 | 200 | 1000 | $10^6$ |
| 25 | 40 | 500 | 1,000 | 20 | 200 | $2 \times 10^5$ |
| 25 | 40 | 200 | 2,000 | 50 | 200 | $2 \times 10^5$ |
| 25 | 40 | 2,000 | 2,000 | 50 | 2000 | $2 \times 10^6$ |

TABLE 2-continued

| Packing depth (cm.) | Packing width (cm) | Magnet length (cm) | Magnetic Field Intensity (gauss) | Draining velocity (cm/min) | Velocity of chain (cm/min) | Production rate (cc/min) |
|---|---|---|---|---|---|---|
| 25 | 40 | 500 | 6,000 | 200 | 2000 | $2 \times 10^6$ |

A production rate of $10^5$ cc/min is equivalent to a rate of approximately 1.4 tonnes per hour of product since the feed suspension contains 20% by weight of china clay.

We claim:

1. A method of separating magnetisable particles from a fluid utilizing a plurality of interconnected open-topped tanks and a plurality of fluid-permeable masses of magnetisable material, which method comprises performing the following operations on each tank;
   (a) at least partially filling the tank, with the associated mass of magnetisable material therein, with fluid containing magnetisable particles such that the fluid and magnetisable particles contact the mass of magnetisable material, the fluid and particles being prevented from escaping from the tank during filling;
   (b) either before, during or after filling, moving the tank into a separating zone in which a magnetic field is established;
   (c) holding the fluid containing the magnetisable particles, within the tank, substantially stationary with respect to the mass of magnetisable material for a finite period of time after completion of steps (a) and (b);
   (d) providing relative movement between the tank and the mass of magnetisable material as the tank passes through the separating zone until the mass of magnetisable material is outside the tank, such that the tank and mass of magnetisable material move vertically apart from one another whereby the fluid is drained from the mass of magnetisable material;
   (e) after draining, moving the tank out of the separating zone; and
   (f) removing magnetisable particles which have been retained within the mass of magnetisable material by magnetic attraction; wherein the tanks are moved one after another into and out of the separating zone.

2. A method according to claim 1 wherein the fluid is drained from the mass of magnetisable material by opening an outlet of the separating chamber to discharge the fluid from the separating chamber, the outlet being maintained in a closed state during filling of the separating chamber.

3. A method according to claim 1 wherein the draining includes providing relative movement apart of the mass of magnetisable material and the separating chamber containing the fluid so as to separate the mass of magnetisable material from the fluid.

4. A method according to claim 3 wherein said vertical movement is provided by moving each separating chamber downwards with respect to the associated mass of magnetisable material as the separating chambers and associated masses of magnetisable material pass substantially horizontally through the separating zone.

5. A method according to claim 1, wherein each separating chamber is at least partially filled with fluid containing magnetisable particles prior to being passed through the separating zone.

6. A magnetic separator for separating magnetisable particles from a fluid, said separator comprising:
   (a) a plurality of interconnected open-topped tanks;
   (b) a plurality of interconnected fluid-permeable masses of magnetisable material, each mass of magnetisable material being associated with a respective one of the tanks;
   (c) magnet means for establishing a magnetic field in a separating zone;
   (d) means for passing the plurality of interconnected tanks and the plurality of interconnected masses of magnetisable material continuously through the separating zone;
   (e) filling means for introducing fluid containing magnetisable particles into each tank with the associated mass of magnetisable material therein so as to immerse at least a portion of said mass;
   (f) vertically diverging means for guiding the plurality of interconnected tanks and plurality of interconnected masses of magnetisable material, such that each tank, with the associated magnetisable material therein, passes through the separating zone and after a finite period of time after filling of the tank and entry of the tank into the separating zone, each tank and the associated mass of magnetisable material then move vertically apart from one another until the mass of magnetisable material is outside the tank; and
   (g) means for removing magnetisable particles from each mass of magnetisable material after the mass of magnetisable material has been passed out of the separating zone.

7. A magnetic separator according to claim 6, wherein the means for removing magnetisable particles comprises means for flushing further fluid through the mass of magnetisable material associated with each separating chamber outside the separating zone.

8. A magnetic separator according to claim 6, wherein the draining means comprises a closable outlet of each separating chamber.

9. A magnetic separator according to claim 8, wherein said draining means includes means for automatically opening the outlet of each separating chamber after the finite period of time and for automatically closing the outlet of each separating chamber after the magnetisable particles have been removed from the mass of magnetisable material associated with that separating chamber.

10. A magnetic separator according to claim 8 wherein the throughflow cross-section of the outlet of each separating chamber is adjustable between a first value and a second value greater than the first value and means are provided for automatically adjusting the throughflow cross-section of the outlet from the first value to the second value after draining of the first-mentioned fluid and before further fluid is flushed through the mass of magnetisable material.

11. A magnetic separator according to claim 6 wherein the guide means comprise a track means for the tanks inclined downwards in the separating zone in the direction of motion of the plurality of interconnected tanks, and an overhead rail means for the masses of magnetisable material extending substantially horizontally through the separating zone, whereby, as the tanks and the associated masses of magnetisable material pass through the separating zone, the tanks gradually descend below the level of the masses of magnetisable material.

12. A magnetic separator according to claim 11, wherein means are provided for tipping each tank sideways after passing out of the separating zone to discharge fluid from the tank.

13. A magnetic separator according to claim 12, wherein each tank runs on wheels on said track means and said track means comprises an inverted T-section track, the track twisting sideways after passing out of the separating zone so as to tip the tanks sideways in that region.

14. A magnetic separator according to claim 6, wherein the plurality of interconnected tanks is in the form of an endless loop.

15. A magnetic separator according to claim 14, wherein the loop passes through two separating zones in which a magnetic field is established by the magnet means.

16. A magnetic separator according to claim 6, wherein the filling means is arranged to introduce fluid containing magnetisable particles into each tank outside the separating zone.

* * * * *